United States Patent
Tseng et al.

(10) Patent No.: US 8,659,886 B2
(45) Date of Patent: Feb. 25, 2014

(54) PORTABLE COMPUTER APPARATUS

(75) Inventors: Kuan-Hsueh Tseng, Hsinchu (TW);
Yu-Yu Chiang, Hsinchu (TW);
Kuo-Lun Huang, Hsinchu (TW);
Shang-Ching Tseng, Hsinchu (TW);
Sheng-Chih Sun, Hsinchu (TW); Chi Ho, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 184 days.

(21) Appl. No.: 13/370,321

(22) Filed: Feb. 10, 2012

(65) Prior Publication Data

US 2013/0135810 A1    May 30, 2013

(30) Foreign Application Priority Data

Nov. 30, 2011    (TW) .............................. 100143994 A

(51) Int. Cl.
*G06F 1/16* (2006.01)
(52) U.S. Cl.
USPC ... 361/679.27; 345/173; 455/566; 248/179.1; 348/725
(58) Field of Classification Search
USPC ........... 348/837, 836, 725, 135, 77, 357, 147;
349/58, 61, 64; 361/679.21, 699.22,
361/679.23, 679.24, 679.25, 679.26,
361/679.27, 679.28, 679.29, 679.41,
361/679.58, 679.57, 679.43, 679.5, 679.54,
361/679.01, 679.17, 679.55, 679.12;
455/575.1, 575.2, 575.3, 575.4, 566,
455/351, 73, 90.1; 248/146, 122.1, 408,
248/176.1, 176.3, 179.1; 345/184, 168,
345/163, 211, 690, 173, 97

See application file for complete search history.

(56) References Cited

U.S. PATENT DOCUMENTS 7,184,263 B1 *    2/2007  Maskatia .................. 361/679.27
2012/0236484 A1 *    9/2012  Miyake .................... 361/679.01

* cited by examiner

*Primary Examiner* — Hung Duong
(74) *Attorney, Agent, or Firm* — Winston Hsu; Scott Margo

(57) ABSTRACT

A portable computer apparatus includes a display module, a host module, at least one shaft mechanism, and an antenna. The display module has a first pivot side and includes first and second upper-cover members and a display device contained in the first and second upper-cover members. The host module has a second pivot side and includes first and second lower-cover members and a host device contained in the first and second lower-cover members. The host device is electrically connected to the display device and the antenna. The shaft mechanism is pivotally connected to at least one of the first and second upper-cover members corresponding to the first pivot side and at least one of the first and second lower-cover members corresponding to the second pivot side. The antenna is integrally formed with the shaft mechanism or on one of the first and second pivot sides.

16 Claims, 12 Drawing Sheets

PORTABLE COMPUTER APPARATUS

BACKGROUND OF THE INVENTION

1. Field of the Invention

The present invention relates to a portable computer apparatus, and more specifically, to a portable computer apparatus with an antenna integrally formed with a shaft mechanism or on one of a first pivot side of a display module and a second pivot side of a host module.

2. Description of the Prior Art

In general, a portable computer apparatus with a wireless transmission function (e.g. a notebook) usually adopts a configuration that an antenna is disposed on an upper zone of a casing (usually made of non-metal material) which is used for containing a display panel of the portable computer apparatus, for preventing signal transmission of the antenna from being influenced by a metal zone of the portable computer apparatus. Thus, the upper zone of the frame additionally needs an antenna containing structure formed thereon for containing the antenna. However, as a portable computer apparatus increasingly becomes lighter, thinner, shorter, and smaller in recent years, the said design is not only disadvantageous for the thinning design of the portable computer apparatus, but also limits the structural design of the portable computer apparatus and flexibility of the portable computer apparatus in use of its structure space. Furthermore, if the portable computer apparatus has a full-metal casing, additional disposal of the said antenna containing structure may influence the overall appearance quality of the portable computer apparatus.

SUMMARY OF THE INVENTION

The present invention provides a portable computer apparatus including a display module, a host module, at least one shaft mechanism, and an antenna. The display module has a first pivot side. The display module includes a first upper-cover member, a display device, and a second upper-cover member. The display device is disposed on the first upper-cover member. The second upper-cover member is connected to the first upper-cover member for containing the display device cooperatively. The host module has a second pivot side. The host module includes a first lower-cover member, a host device, and a second lower-cover member. The host device is disposed on the first lower-cover member and electrically connected to the display device. The second lower-cover member is connected to the first lower-cover member for containing the host device cooperatively. The shaft mechanism is pivotally connected to at least one of the first upper-cover member and the second upper-cover member corresponding to the first pivot side and at least one of the first lower-cover member and the second lower-cover member corresponding to the second pivot side, for making the display module pivotally folded upon the host module or expanded relative to the host module. The antenna is electrically connected to the host device and integrally formed with the shaft mechanism or on one of the first pivot side and the second pivot side.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
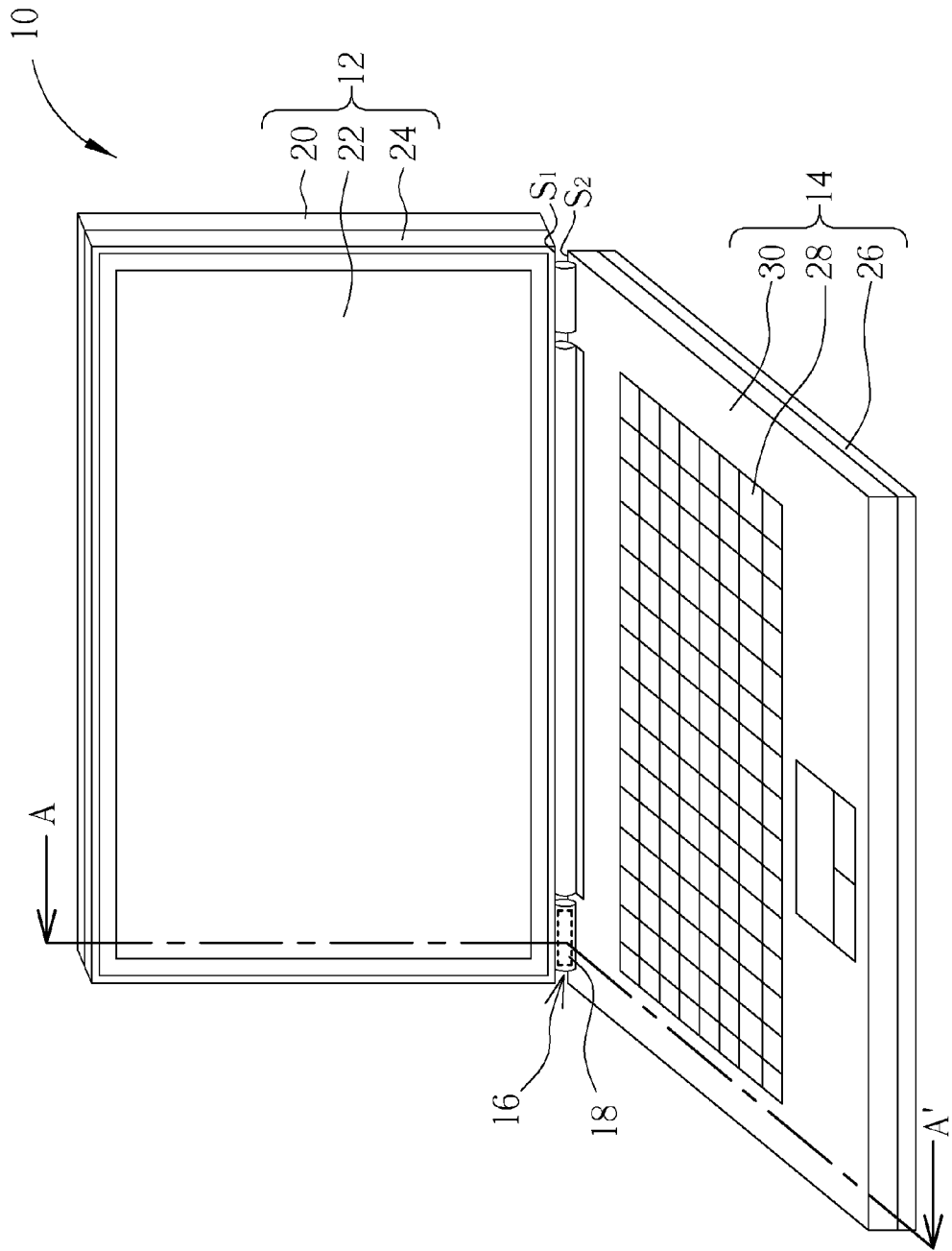
FIG. 1 is a diagram of a portable computer apparatus according to an embodiment of the present invention.

Please refer to FIG. 1, which is a diagram of a portable computer apparatus 10 according to an embodiment of the present invention. As shown in FIG. 1, the portable computer apparatus 10 includes a display module 12, a host module 14, at least one shaft mechanism 16 (two shown in FIG. 1), and an antenna 18. The display module 12 has a first pivot side $S_1$. The display module 12 includes a first upper-cover member 20, a display device 22, and a second upper-cover member 24. The display device 22 is disposed on the first upper-cover member 20 for displaying images. The second upper-cover member 24 is connected to the first upper-cover member 20 for containing the display device 22 cooperatively, so as to fix and protect the display device 22. The host device 14 has a second pivot side $S_2$. The host module 14 has a lower-cover member 26, a host device 28, and a second lower-cover member 30. The host device 28 is disposed on the first lower-cover member 26 and electrically connected to the display device 22 for controlling image display of the display device 22. The host device 28 can include conventional host components, such as a keyboard, a motherboard, and a central processing unit, and the related description is therefore omitted herein since it is commonly seen in the prior art. The second lower-cover member 30 is connected to the first lower-cover member 26 for containing the host device 28 so as to fix and protect the host device 28. The first upper-cover member 20, the second upper-cover member 24, the first lower-cover member 26, and the second lower-cover member 30 are preferably made of metal material, so as to achieve the purpose that the portable computer apparatus 10 can have a full-metal casing.

Figure 2:
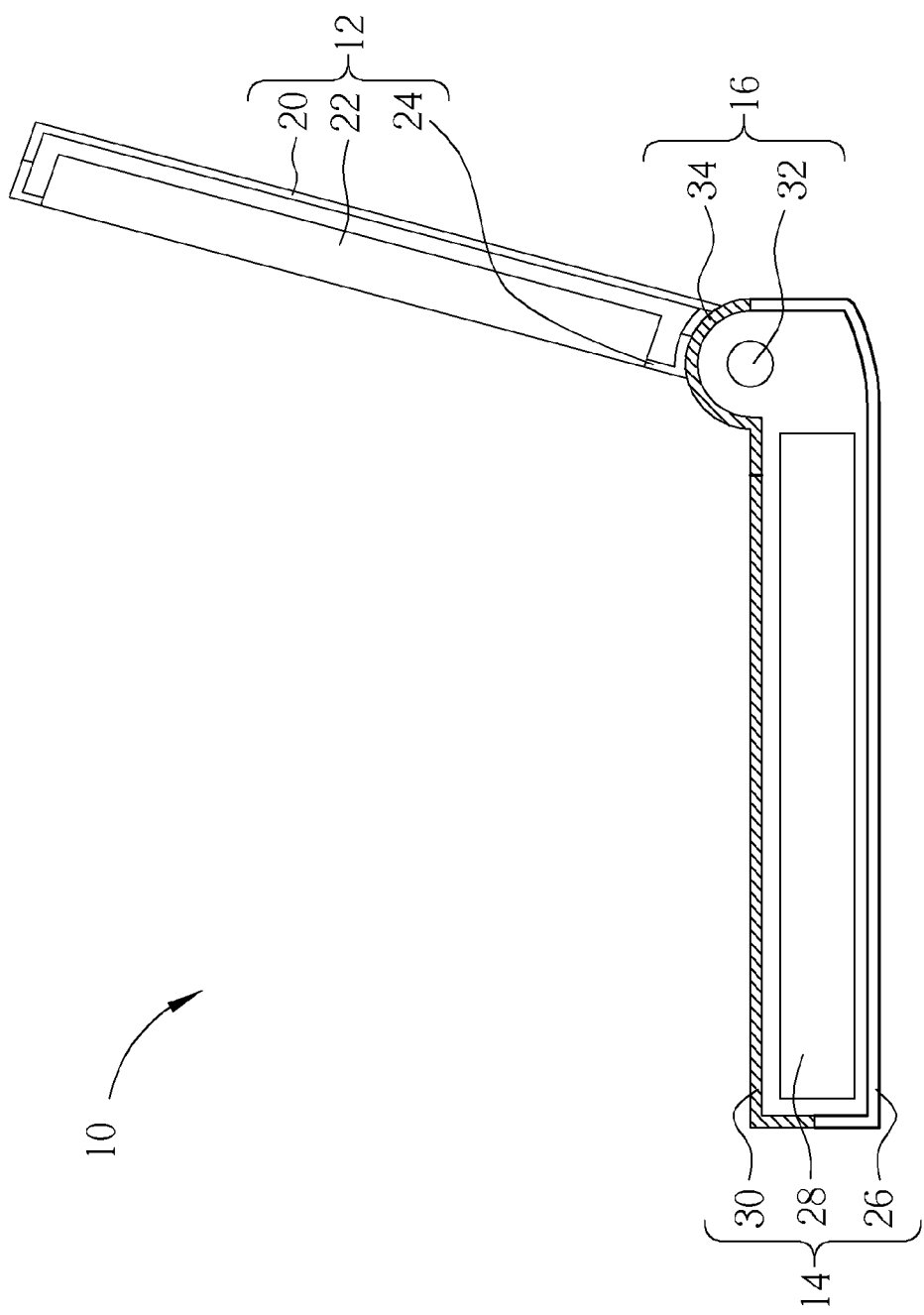
FIG. 2 is a sectional diagram of the portable computer apparatus 10 in FIG. 1 along a section line A-A'.

More detailed description for the shaft mechanism 16 and the antenna 18 is provided as follows. At first, please refer to FIG. 1 and FIG. 2. FIG. 2 is a sectional diagram of the portable computer apparatus 10 in FIG. 1 along a section line A-A'. For simplicity, components in the display module 12, the host module 14, and the shaft mechanism 16 and the related pivotal connection design are depicted briefly in FIG. 2. As shown in FIG. 1 and FIG. 2, the shaft mechanism 16 includes a shaft 32 and a protection cover 34. In this embodiment, the protection cover 34 is integrally formed with the second lower-cover member 30 by an integrally-forming process (e.g. an insert molding process). The protection cover 34 is used to cover the shaft 32 for protecting the shaft 32 and providing the shaft 32 with a dustproof function. The protection cover 34 is preferably made of non-metal material (e.g. plastic material). The shaft 32 is pivotally connected to at least one of the first upper-cover member 20 and the second upper-cover member 24 corresponding to the first pivot side $S_1$ and at least one of the first lower-cover member 26 and the second lower-cover member 30 corresponding to the second pivot side $S_2$. That is, the shaft 32 can be pivotally connected to the first upper-cover member 20 and the second upper-cover member 24, or only pivotally connected to the first upper-cover member 20 or the second upper-cover member 24. Similarly, the shaft 32 can be pivotally connected to the first lower-cover member 26 and the second lower-cover member 30, or only pivotally connected to the first lower-cover member 26 or the second upper-cover member 24. As for which pivotal connection design is utilized, it depends on the practical application of the portable computer apparatus 10. Furthermore, pivotal connection of the shaft 32 to the first upper-cover member 20, the second upper-cover member 24, the first lower-cover member 26, and the second lower-cover member 30 can adopt a shaft design commonly applied to a portable computer apparatus with a foldable function, and the related description is therefore omitted herein.

In summary, the portable computer apparatus 10 utilizes the design that the shaft 32 of the shaft mechanism 16 is pivotally connected to the first pivot side $S_1$ of the display module 12 and the second pivot side $S_2$ of the host module 14, to make the display module 12 capable of rotating relative to the host module 14. Accordingly, the display module 12 can be selectively folded upon the host module 14 for a user to carry conveniently or expanded relative to the host module 14 for the user to operate the portable computer apparatus 10 (e.g. performing a paperwork processing operation or an image displaying operation).

Figure 3:
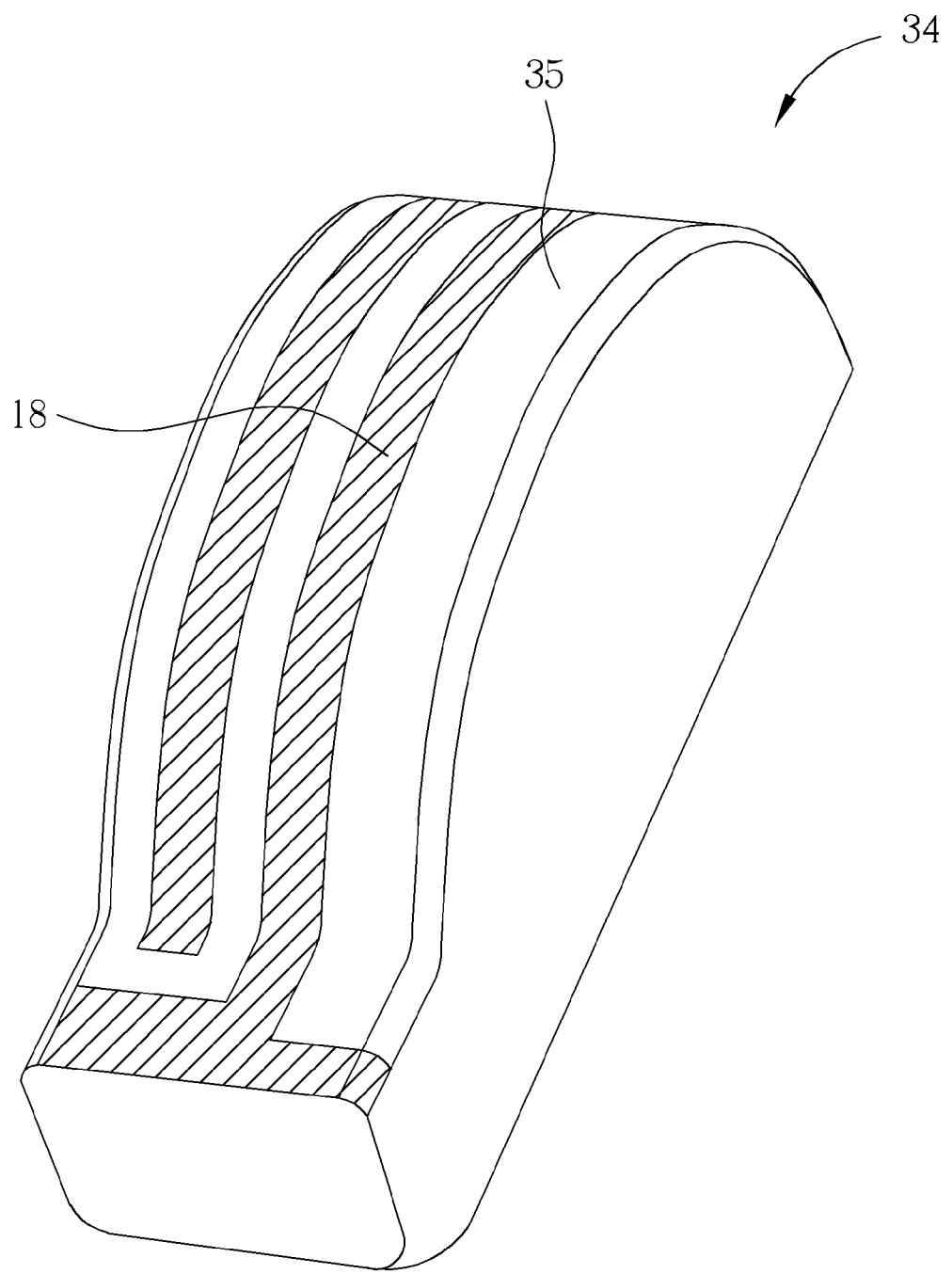
FIG. 3 is a diagram of an antenna being formed on a protection cover in FIG. 2.

Next, please refer to FIG. 1 and FIG. 3. FIG. 3 is a diagram of the antenna 18 being formed on the protection cover 34 in FIG. 2. As shown in FIG. 1 and FIG. 3, the antenna 18 is integrally formed with the protection cover 34 along the contour of the protection cover 34. In this embodiment, the antenna 18 is formed on an outer surface 35 of the protection cover 34 by an LDS (Laser Direct Structuring) process. In brief, Laser is utilized to generate an activation layer corresponding to the shape of the antenna 18 on the outer surface 35 of the protection cover 34, and an electroplating process is then performed to adhere metal material on the activation layer. Accordingly, the antenna 18 can be formed on the protection cover 34 along the contour of the outer surface 35. In such a manner, via the said design that the antenna 18 is integrally formed with the protection cover 34, the present invention can efficiently reduce space occupied by the antenna 18 on the casing components (i.e. the first upper-cover member 20, the second upper-cover member 24, the first lower-cover member 26 and the second lower-cover member 30) of the portable computer apparatus 10, so as to increase flexibility of the portable computer apparatus 10 in use of its structure space and solve the problem that the antenna containing structure influences the overall appearance quality of the portable computer apparatus mentioned in the prior art.

To be noted, the portable computer apparatus 10 can also utilize other process with the same forming effect, such as a pad printing process, an insert molding process, or an Ag paste printing process. In other words, all processes capable of making the antenna 18 integrally formed with the protection cover 34 along the contour of the protection cover 34 may fall within the scope of the present invention. In addition, the antenna 18 can be formed on a side planar section of the outer surface 35 of the protection cover 34 or on an inner wall (not shown in the figures) of the protection cover 34 instead of being formed on the outer surface 35 of the protection cover 34 as shown in FIG. 3.

Figure 4:
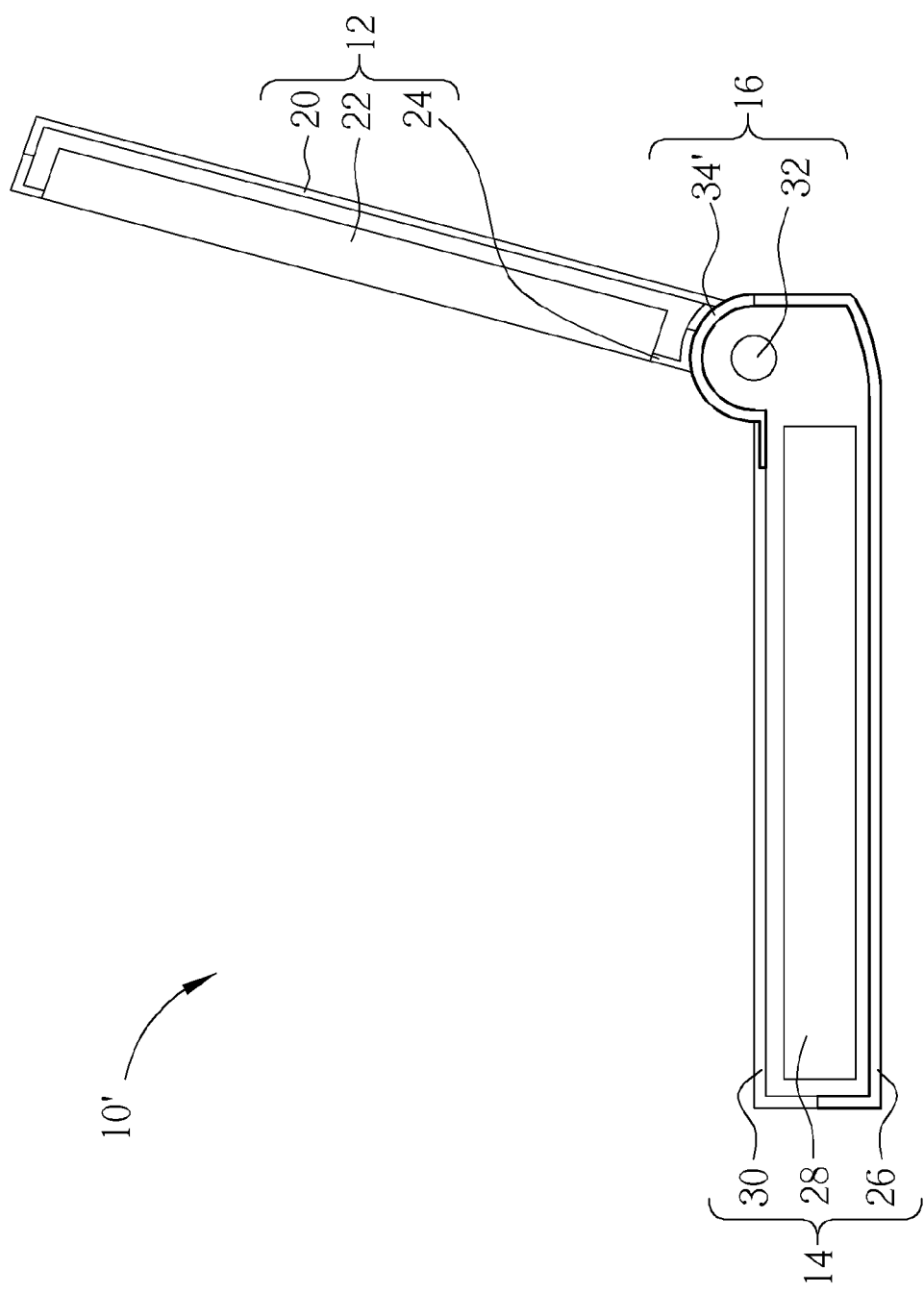
FIG. 4 is a sectional diagram of a protection cover of a portable computer apparatus being disposed on a second lower-cover member according to another embodiment of the present invention.

Furthermore, connection of the protection cover and the second lower-cover member is not limited to the integrally forming design mentioned in the said embodiment. For example, please refer to FIG. 4, which is a sectional diagram of a protection cover 34' of a portable computer apparatus 10' being disposed on the second lower-cover member according to another embodiment of the present invention. Components both mentioned in FIG. 4 and the aforesaid embodiment represent components with similar functions or structures, and the related description is omitted herein. The major difference between the portable computer apparatus 10' and the portable computer apparatus 10 is the connection design of the protection cover and the second lower-cover member. As shown in FIG. 4, the protection cover 34' is detachably disposed on the second lower-cover member 30. In other words, in this embodiment, the protection cover 34' is an independent appearance part for being detachably assembled on the second lower-cover member 30, so as to protect the shaft 32 and provide the antenna 18 with sufficient forming space. As for the integrally forming design of the antenna 18 and the protection cover 34', the related description can be reasoned according to the aforesaid embodiment and therefore omitted herein.

Figure 5:
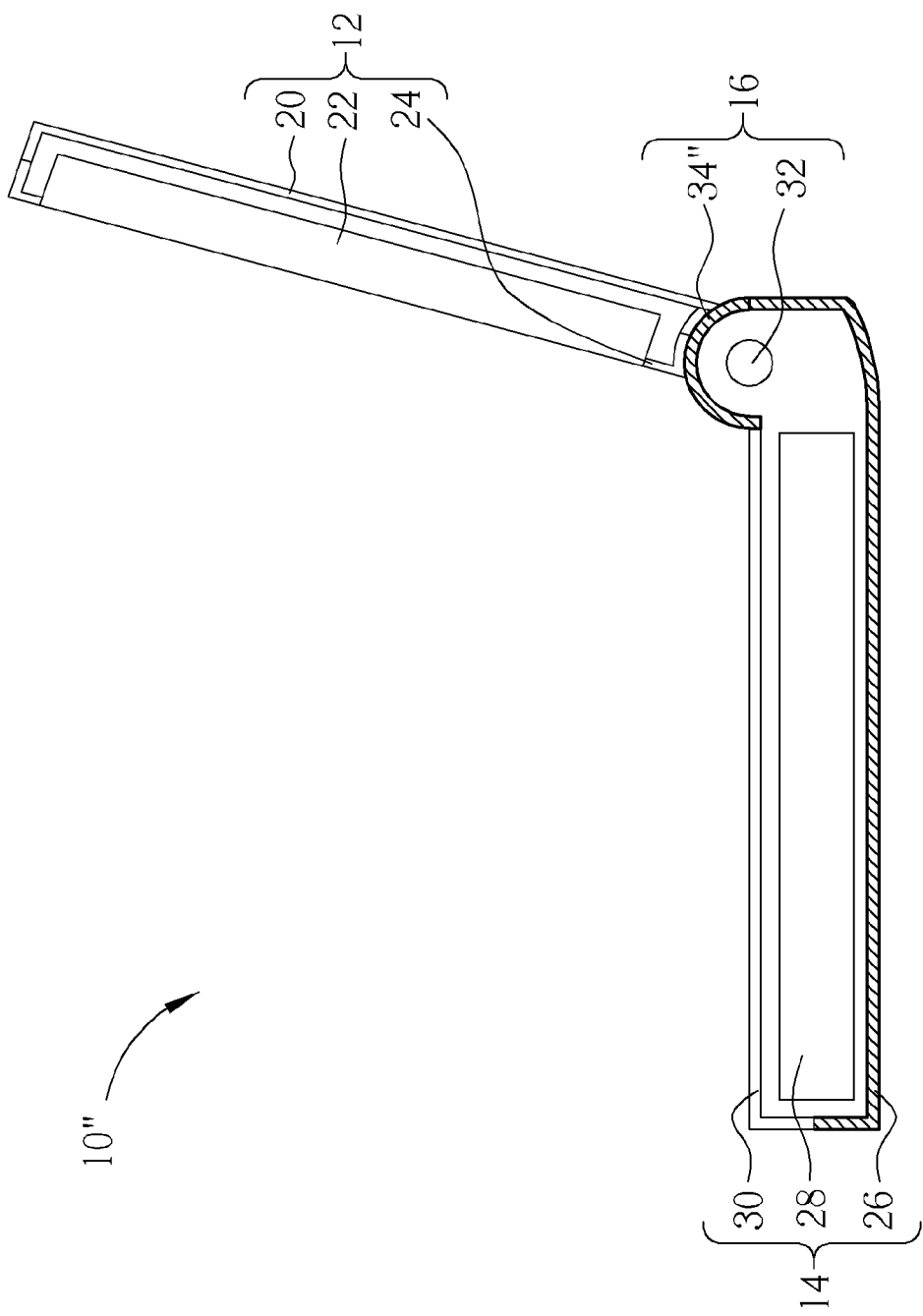
FIG. 5 is a sectional diagram of a protection cover of a portable computer apparatus being integrally formed with a first lower-cover member according to another embodiment of the present invention.
Figure 6:
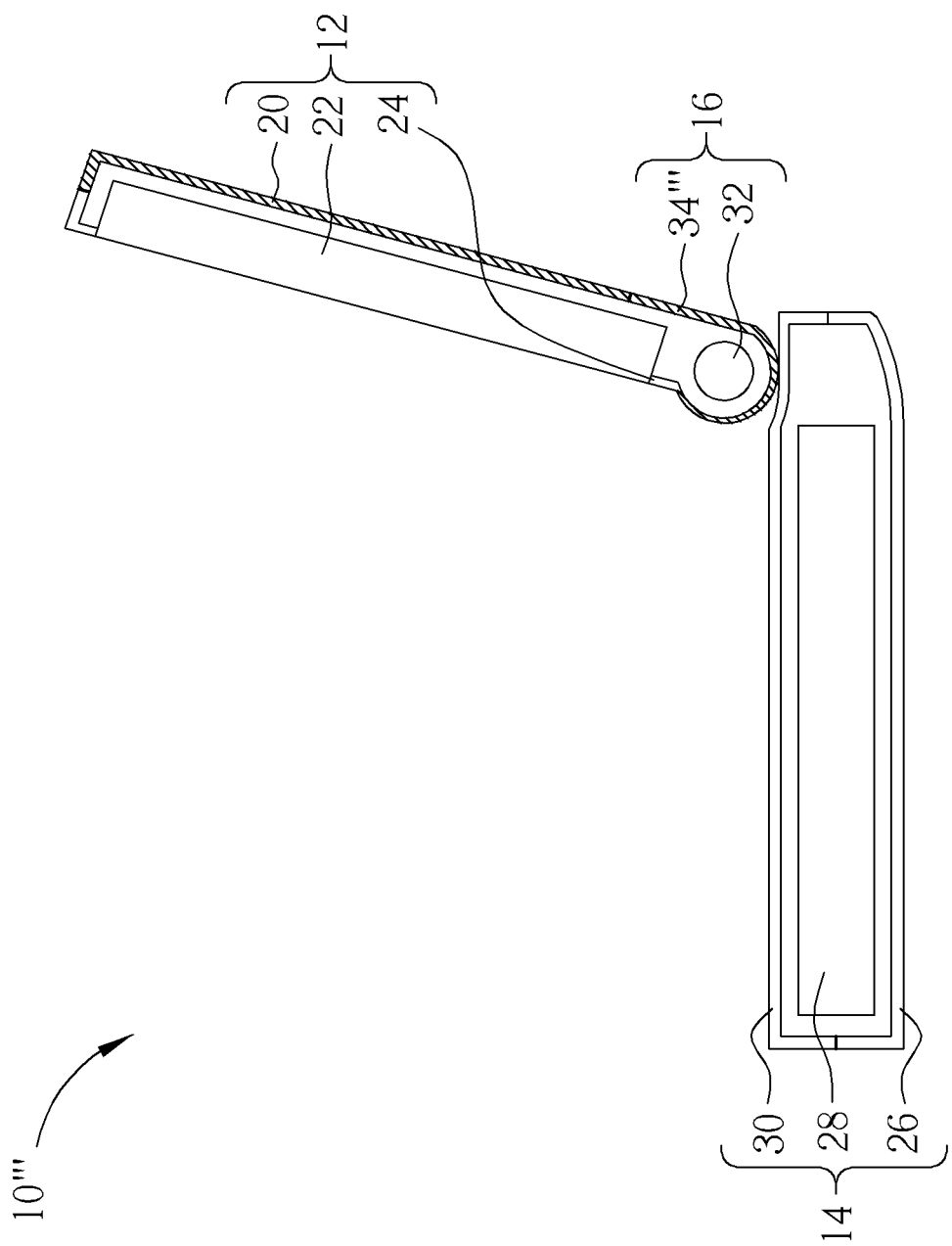
FIG. 6 is a sectional diagram of a protection cover of a portable computer apparatus being integrally formed with a first upper-cover member according to another embodiment of the present invention.
Figure 7:
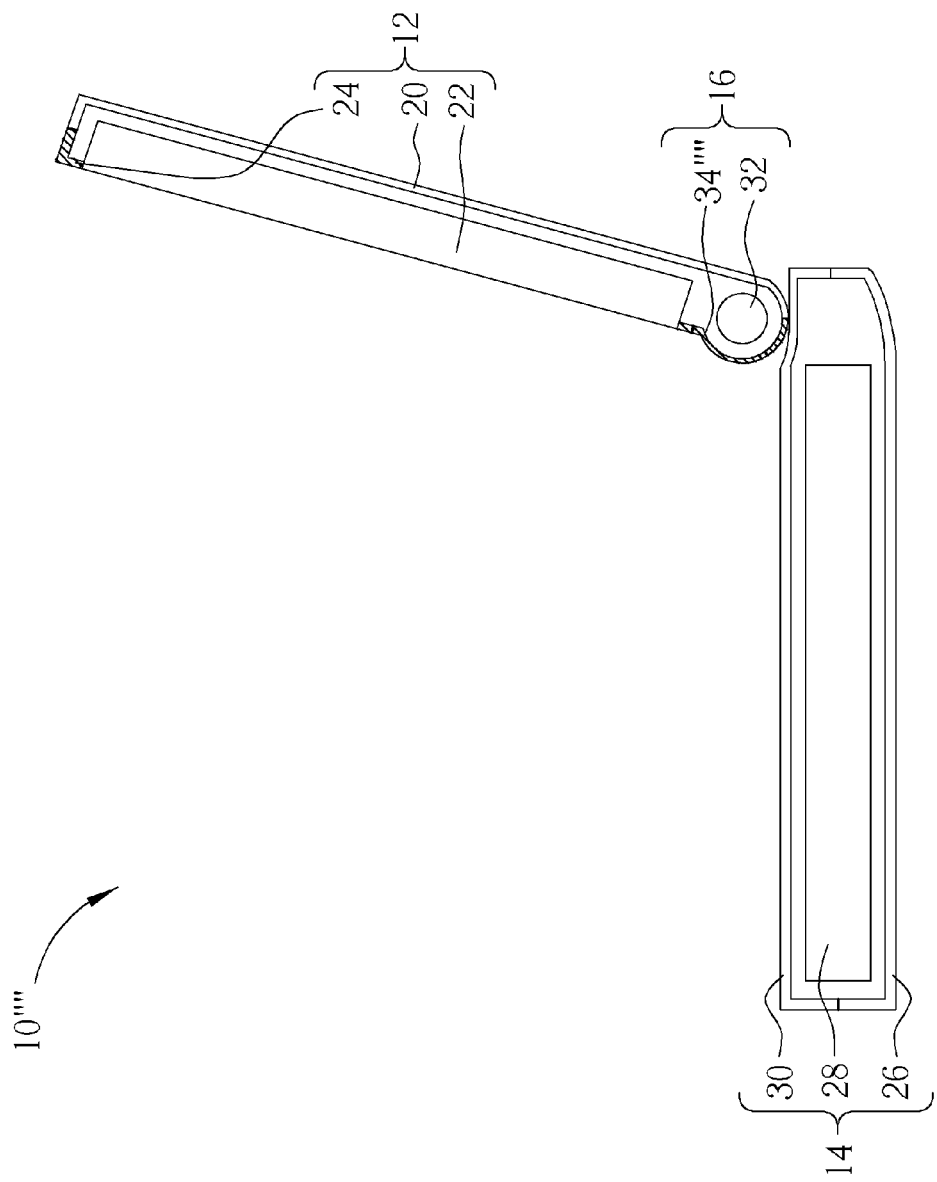
FIG. 7 is a sectional diagram of a protection cover of a portable computer apparatus being integrally formed with a second upper-cover member according to another embodiment of the present invention.

Furthermore, the protection cover provided by the present invention is not limited to be integrally formed with or detachably disposed on the second lower-cover member 30, meaning that the protection cover provided by the present invention can also be integrally formed with or detachably disposed on the first lower-cover member 26, the first upper-cover member 20, or the second upper-cover member 24. The related configurations can be, for example, as shown in FIG. 5, FIG. 6, and FIG. 7. FIG. 5 is a sectional diagram of a protection cover 34'' of a portable computer apparatus 10'' being integrally formed with the first lower-cover member 26 according to another embodiment of the present invention. FIG. 6 is a sectional diagram of a protection cover 34''' of a portable computer apparatus 10''' being integrally formed with the first upper-cover member 20 according to another embodiment of the present invention. FIG. 7 is a sectional diagram of a protection cover 34'''' of a portable computer apparatus 10'''' being integrally formed with the second upper-cover member 24 according to another embodiment of the present invention. Accordingly, flexibility of the portable computer apparatus provided by the present invention in disposal of the protection cover can be further increased. As for description for the related derivative designs and the related integrally forming design, it can be reasoned according to the aforesaid embodiment. For example, the protection cover 34'' can be an independent appearance part for being detachably assembled on the first lower-cover member 26, and the antenna 18 can be formed on the protection cover 34" by an LDS process.

Figure 8:
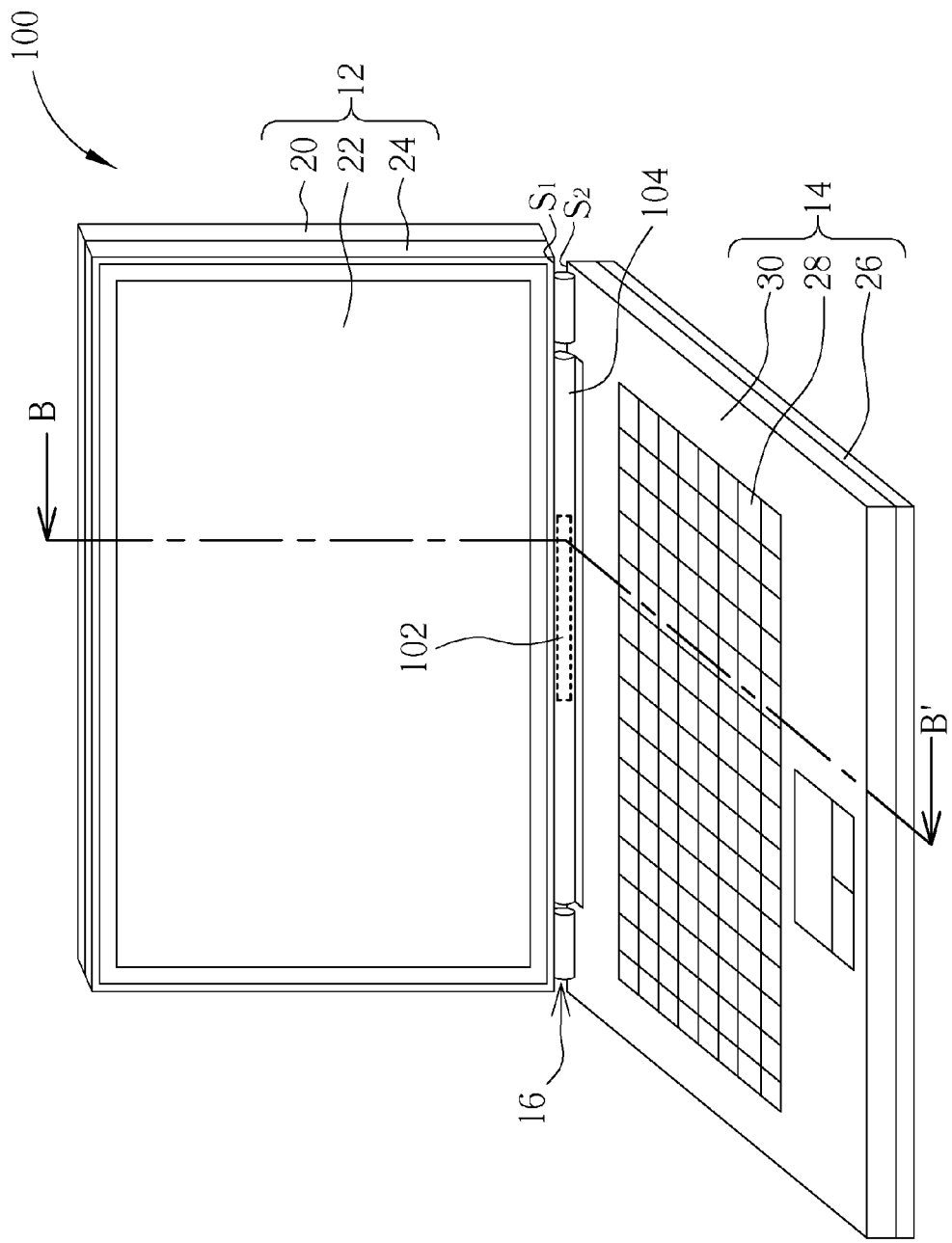
FIG. 8 is a diagram of a portable computer apparatus according to another embodiment of the present invention.
Figure 9:
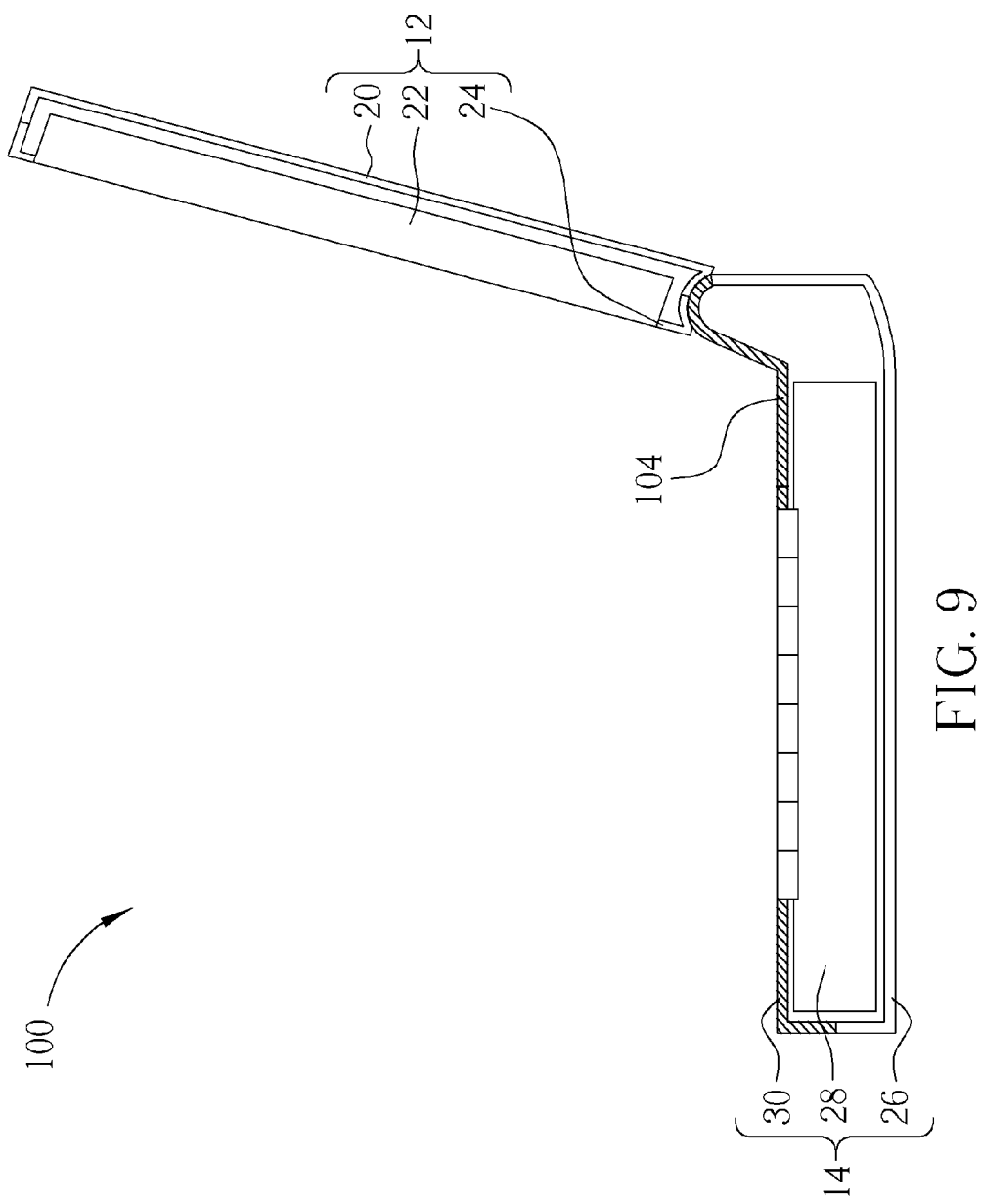
FIG. 9 is a sectional diagram of the portable computer apparatus in FIG. 8 along a section line B-B'.

It should be mentioned that the present invention can also adopt the design that the antenna is formed on the first pivot side $S_1$ of the display module 12 or the second pivot side $S_2$ of the host module 14 instead. For example, please refer to FIG. 8 and FIG. 9. FIG. 8 is a diagram of a portable computer apparatus 100 according to another embodiment of the present invention. FIG. 9 is a sectional diagram of the portable computer apparatus 100 in FIG. 8 along a section line B-B'. Components mentioned in FIG. 8, FIG. 9, and the aforesaid embodiment represent components with similar functions or structures, and the related description is omitted herein. The major difference between the portable computer apparatus 100 and the portable computer apparatus 10 is the forming position of the antenna. As shown in FIG. 8 and FIG. 9, the portable computer apparatus 100 includes the display module 12, the host module 14, the shaft mechanism 16, and an antenna 102. The host module 14 can further include an appearance member 104. In this embodiment, the appearance member 104 is preferably disposed on the second lower-cover member 30 corresponding to the second pivot side $S_2$ by an integrally forming process (e.g. an insert molding process), but is not limited thereto, meaning that the appearance member 104 can also be detachably assembled on the second lower-cover member 30. The antenna 102 is formed on the appearance member 104 along the contour of the appearance member 104. The forming design of the antenna 102 can adopt the integrally forming process mentioned in the aforesaid embodiment, such as an LDS process, an Ag paste printing process, a pad printing process, or an insert molding process. In such a manner, via the design that the antenna 102 is directly formed on the appearance member 104, the present invention not only reduces space occupied by the antenna 102 on the portable computer apparatus 100, but also utilizes the appearance member 104 to provide more space (compared with the antenna forming space provided by the shaft mechanism 16) for forming of the antenna 102, so that the present invention can be further applied to a large-sized antenna (e.g. a near-field communication (NFC) antenna).

Figure 10:
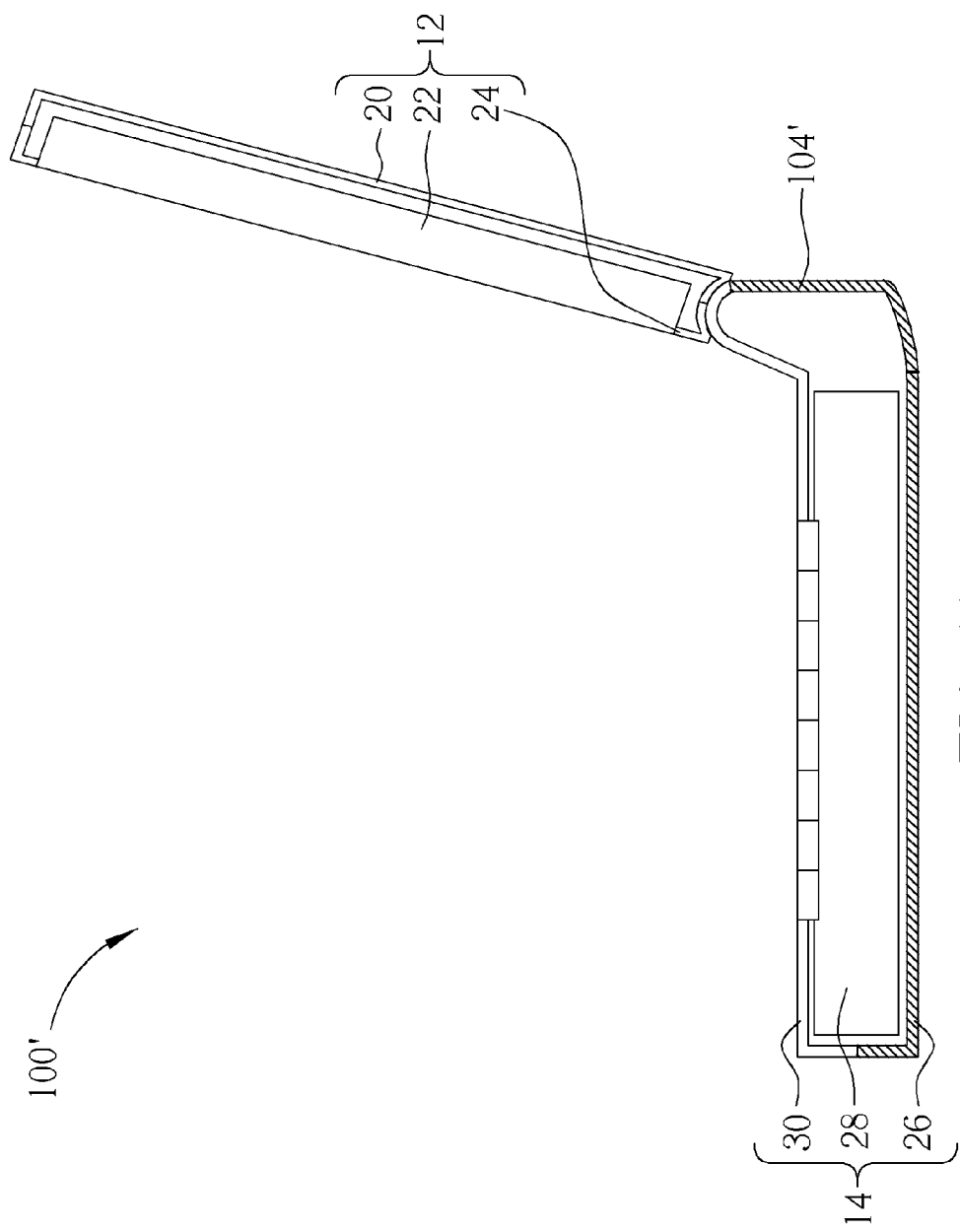
FIG. 10 is a sectional diagram of an appearance member of a portable computer apparatus being integrally formed with the first lower-cover member according to another embodiment of the present invention.
Figure 11:
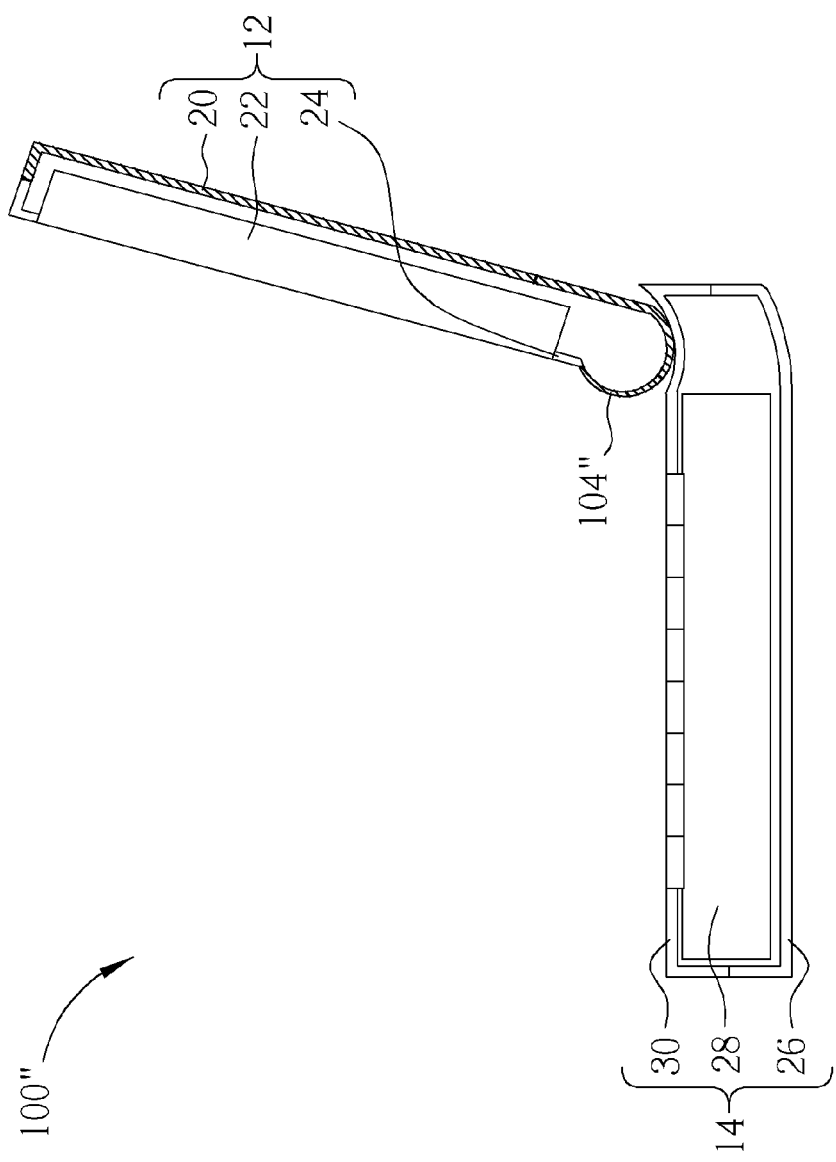
FIG. 11 is a sectional diagram of an appearance member of a portable computer apparatus being integrally formed with the first upper-cover member according to another embodiment of the present invention.
Figure 12:
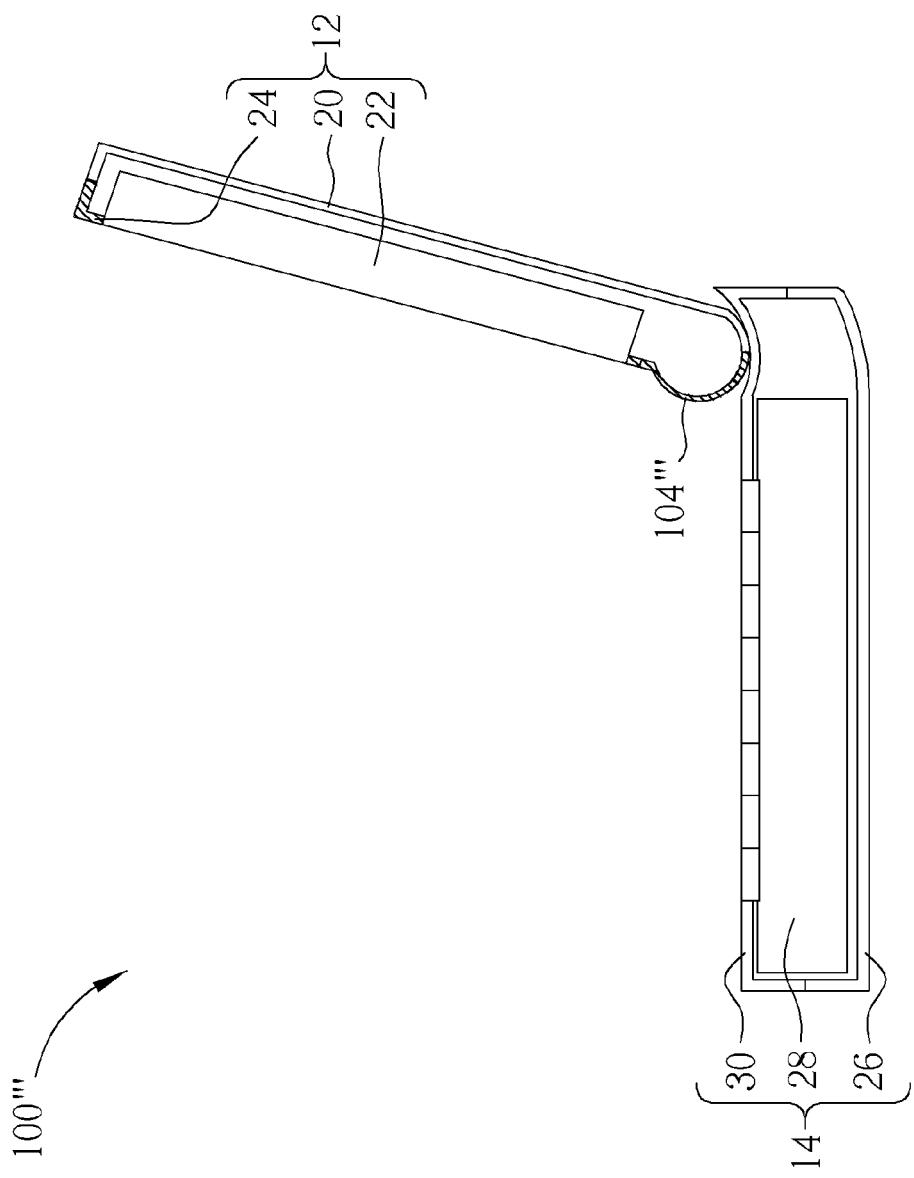
FIG. 12 is a sectional diagram of an appearance member of a portable computer apparatus being integrally formed with the second upper-cover member according to another embodiment of the present invention.

Similarly, as mentioned above, the appearance member provided by the present invention is not limited to be integrally formed with or detachably disposed on the second lower-cover member 30, meaning that the appearance member provided by the present invention can also be integrally formed with or detachably disposed on the first lower-cover member 26, the first upper-cover member 20, or the second upper-cover member 24. The related configurations can be, for example, as shown in FIG. 10, FIG. 11, and FIG. 12. FIG. 10 is a sectional diagram of an appearance member 104' of a portable computer apparatus 100' being integrally formed with the first lower-cover member 26 according to another embodiment of the present invention. FIG. 11 is a sectional diagram of an appearance member 104" of a portable computer apparatus 100" being integrally formed with the first upper-cover member 20 according to another embodiment of the present invention. FIG. 12 is a sectional diagram of an appearance member 104''' of a portable computer apparatus 100''' being integrally formed with the second upper-cover member 24 according to another embodiment of the present invention. Accordingly, flexibility of the portable computer apparatus provided by the present invention in disposal of the appearance member can be further increased. As for description for the related derivative designs and the related integrally forming design, it can be reasoned according to the aforesaid embodiment. For example, the appearance member 104' can be detachably assembled on the first lower-cover member 26, and the antenna 102 can be formed on the appearance member 104' by an LDS process. To be noted, since disposal of the appearance member 104' corresponds to positions of output/input ports (e.g. a network port and a universal serial bus) on a conventional portable computer apparatus (as shown in FIG. 10), the appearance member 104' can also be utilized as a port protection cover for protection of input/output ports on the portable computer apparatus 100'.

Compared with the prior art, the present invention utilizes the design that the antenna is integrally formed with the shaft mechanism, to replace additional disposal of the said antenna containing structure. Accordingly, the present invention can efficiently reduce space occupied by the antenna on the casing components of the portable computer apparatus, so as to increase flexibility of the portable computer apparatus in use of its structure space and solve the problem that the antenna containing structure influences the overall appearance quality of the portable computer apparatus mentioned in the prior art. Furthermore, via the design that the antenna is integrally formed on the pivot side of the display module or the host module, the present invention can be further applied to a large-sized antenna.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable computer apparatus comprising:
   a display module having a first pivot side, the display module comprising:
      a first upper-cover member;
      a display device disposed on the first upper-cover member; and
      a second upper-cover member connected to the first upper-cover member for containing the display device cooperatively;
   a host module having a second pivot side, the host module comprising:
      a first lower-cover member;
      a host device disposed on the first lower-cover member and electrically connected to the display device; and
      a second lower-cover member connected to the first lower-cover member for containing the host device cooperatively;
   at least one shaft mechanism pivotally connected to at least one of the first upper-cover member and the second upper-cover member corresponding to the first pivot side and at least one of the first lower-cover member and the second lower-cover member corresponding to the second pivot side, for making the display module pivotally folded upon the host module or expanded relative to the host module; and
   an antenna electrically connected to the host device and integrally formed with the shaft mechanism or on one of the first pivot side and the second pivot side.

2. The portable computer apparatus of claim 1, wherein the shaft mechanism comprises:
   a shaft pivotally connected to at least one of the first upper-cover member and the second upper-cover member corresponding to the first pivot side and at least one of the first lower-cover member and the second lower-cover member corresponding to the second pivot side; and
   a protection cover disposed on the first upper-cover member, the second upper-cover member, the first lower-cover member, or the second lower-cover member for covering the shaft, the antenna being integrally formed with the protection cover along a contour of the protection cover.

3. The portable computer apparatus of claim 2, wherein the antenna is integrally formed with the protection cover by an LDS (Laser Direct Structuring) process, an Ag paste printing process, a pad printing process, or an insert molding process.

4. The portable computer apparatus of claim 2, wherein the protection cover is integrally formed or detachably disposed on the first upper-cover member, the second upper-cover member, the lower-cover member or the second lower-cover member.

5. The portable computer apparatus of claim 2, wherein the antenna is formed on an outer surface or an inner wall of the protection cover.

6. The portable computer apparatus of claim 2, wherein the first upper-cover member, the second upper-cover member, the lower-cover member and the second lower-cover member are made of metal material, and the protection cover is made of non-metal material.

7. The portable computer apparatus of claim 1, wherein the host module further comprises:
an appearance member disposed on at least one of the first lower-cover member and the second lower-cover member corresponding to the second pivot side, the antenna being formed with the appearance member along a contour of the appearance member.

8. The portable computer apparatus of claim 7, wherein the antenna is integrally formed with the appearance member by an LDS process, an Ag paste printing process, a pad printing process, or an insert molding process.

9. The portable computer apparatus of claim 7, wherein the appearance member is integrally formed with or detachably disposed on at least one of the first lower-cover member and the second lower-cover member.

10. The portable computer apparatus of claim 7, wherein the antenna is formed on an outer surface or an inner wall of the appearance member.

11. The portable computer apparatus of claim 7, wherein the first upper-cover member, the second upper-cover member, the lower-cover member and the second lower-cover member are made of metal material, and the appearance member is made of non-metal material.

12. The portable computer apparatus of claim 1, wherein the display module further comprises:
an appearance member disposed on at least one of the first upper-cover member and the second upper-cover member corresponding to first pivot side, the antenna being integrally formed with the appearance member along a contour of the appearance member.

13. The portable computer apparatus of claim 12, wherein the antenna is integrally formed with the appearance member by an LDS process, an Ag paste printing process, a pad printing process, or an insert molding process.

14. The portable computer apparatus of claim 12, wherein the appearance member is integrally formed with or detachably disposed on at least one of the first upper-cover member and the second upper-cover member.

15. The portable computer apparatus of claim 12, wherein the antenna is formed on an outer surface or an inner wall of the appearance member.

16. The portable computer apparatus of claim 12, wherein the first upper-cover member, the second upper-cover member, the lower-cover member and the second lower-cover member are made of metal material, and the appearance member is made of non-metal material.

* * * * *